April 7, 1959 W. B. NOLAND 2,880,431
MEANS FOR MULTIPLE POSITIONING OF WHEEL
Filed Jan. 3, 1955 2 Sheets-Sheet 1
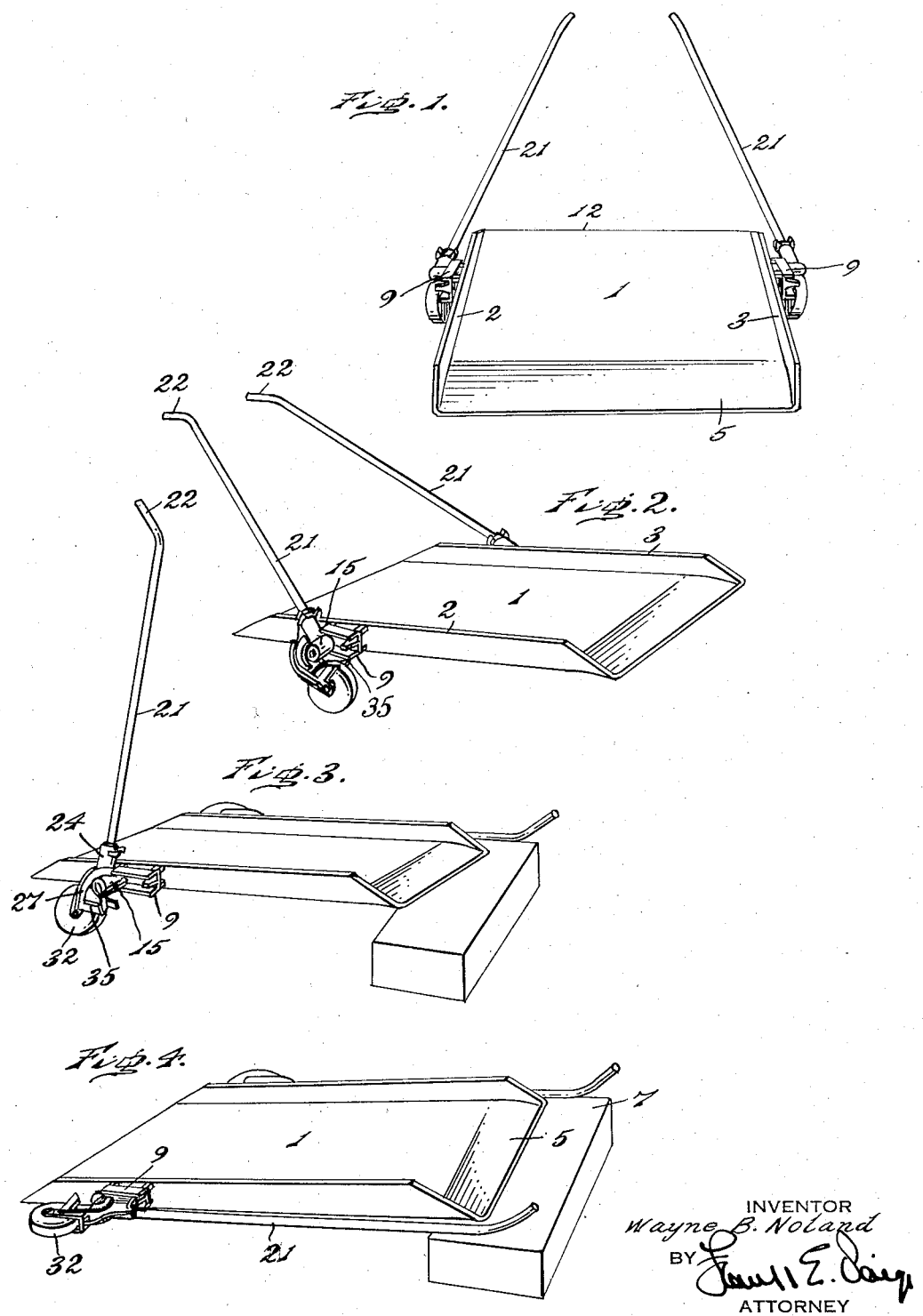

April 7, 1959 W. B. NOLAND 2,880,431
MEANS FOR MULTIPLE POSITIONING OF WHEEL
Filed Jan. 3, 1955 2 Sheets-Sheet 2
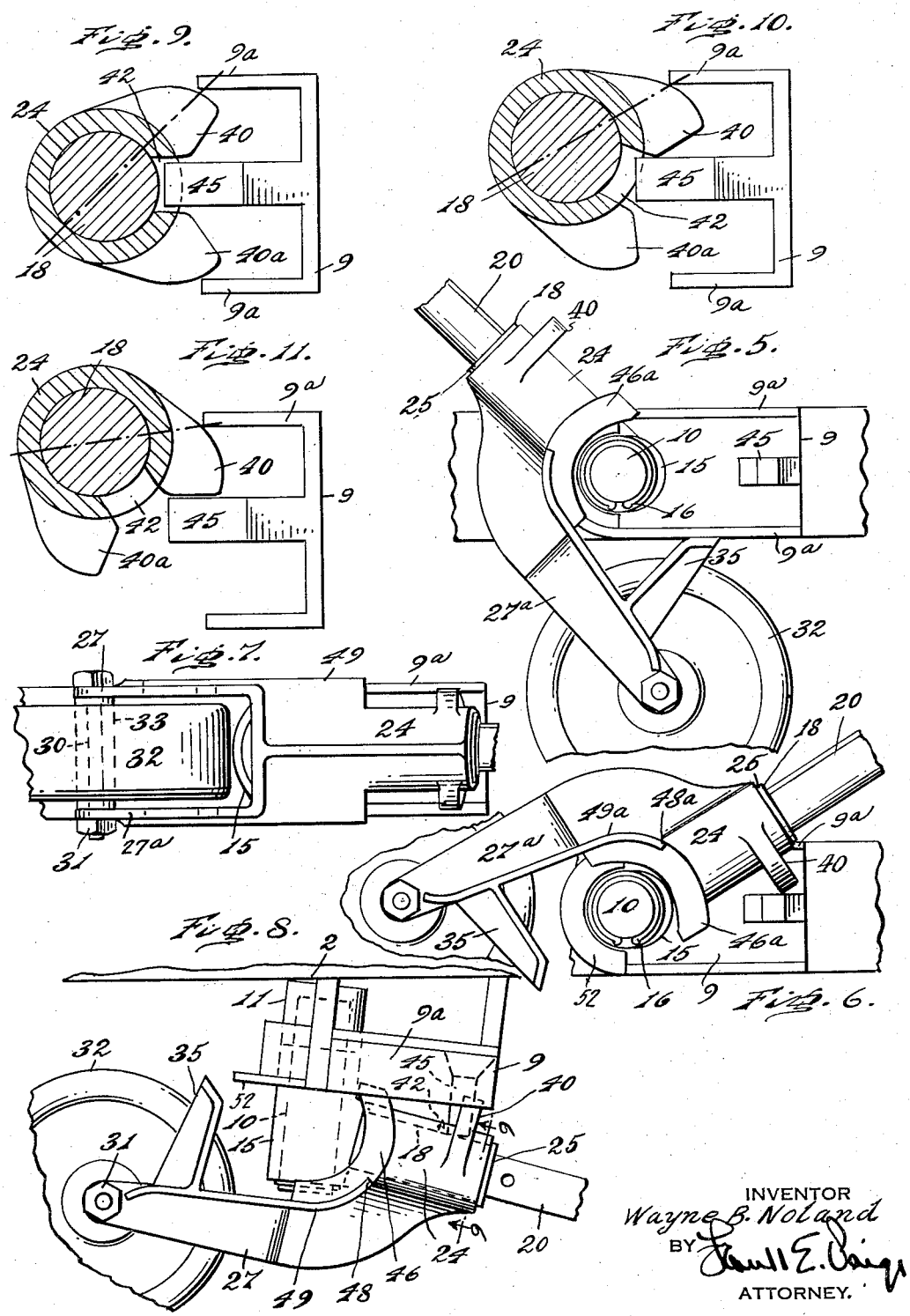
INVENTOR
Wayne B. Noland
BY
ATTORNEY.

United States Patent Office 2,880,431
Patented Apr. 7, 1959

2,880,431

MEANS FOR MULTIPLE POSITIONING OF WHEEL

Wayne B. Noland, Des Moines, Iowa, assignor to Woodford Manufacturing Company, Des Moines, Iowa, a corporation of Iowa Application January 3, 1955, Serial No. 479,550

6 Claims. (Cl. 14—72)

My invention relates to improvement in means for multiple positioning of wheel. Although my invention is particularly applicable for use on loading dock plates, it may be used also on load carrying vehicles, such as carts, dirt conveyors, etc.

Loading dock plates are used principally for bridging the space between loading docks, or platforms, and the floors of trucks, freight cars, etc. when the trucks, freight cars, etc. are positioned closely adjacent to the loading dock. Loading dock plates also are used as a transportable temporary ramp between different levels of a floor in a building, to enable lift trucks, hand trucks, etc. to be used facilely to effect the transfer of goods from one floor level to another.

This application is a continuation-in-part of my copending application Serial No. 404,449, filed January 18, 1954 which matured into Patent No. 2,829,390, dated April 8, 1958 for portable loading dock plate.

As is well known in the transportation field, loading docks, platforms, floors of trucks and freight cars, etc. are not of any uniform standardized heighth. Accordingly, it has been common practice to use an ordinary steel plate as a means to span the gap between loading docks and the floors of trucks, etc. to facilitate the transfer of goods from one location to the other. Even if by coincidence the loading dock and the floor of the truck or freight car should be in the same horizontal plane, a loading dock plate must be used because it is practically impossible to position the floor of a truck or freight car in a contacting relationship with the loading platform.

Loading dock plates made of ordinary steel plate are particularly difficult to handle because of their weight, which must be very substantial in order that the steel plate be of sufficient strength to support the weight of loaded powered lift trucks which are used quite commonly for transferring goods from automobile trucks, etc. to loading docks, and vice versa.

Loading dock plates usually are wide enough to accommodate the full tread width of a lift truck which, when fully loaded, may weigh 4 or 5 tons, or more. A commonly used size of loading dock plate made of ⅜" steel plate will weigh between 400 and 500 pounds.

Such steel dock plates ordinarily do not include any means to facilitate the handling thereof, except, perhaps, a chain fastened at the corner of the plate by which the plate may be dragged. Accidents frequently happen when freight handlers move such steel plates into or out of the desired location, because, for example, the freight handler will lift up one side of the plate by means of the projecting support base of a hand truck, etc. More recently, there has been some limited use made of magnesium plate in the fabrication of loading dock plates, in lieu of steel plate, in order to effect a decrease in the weight of the dock plate which must be moved about by the freight handlers. However, dock plates made of magnesium plate of a sufficient tensile strength cost considerably more than dock plates made of steel plate, and such very much higher cost has been a detriment to a wider use of magnesium plate instead of steel plate in the fabrication of dock plates.

Many attempts have been made in the past to develop some practical means by which a loading dock plate could be handled more facilely, but none has received any substantial commercial acceptance for one reason or another. For example, hydraulically powered means have been utilized for raising and lowering a steel dock plate carried on wheels; another form of dock plate has included rollable means which may be disengaged from the dock plate; another form of dock plate has included a single straight handle, mounted parallel to one side of the dock plate, capable of movement only in a plane parallel to the side of the dock plate, the handle being used to effect the raising or lowering of the support wheels in a plane parallel with the side of the dock plate, and with the wheels mounted on a cross shaft at the underside of the plate, which necessitates such a dock plate to have an undesirable hump in its surface.

The loading dock plates disclosed in my application Serial No. 404,449, now Patent No. 2,829,390, issued April 8, 1958, may be handled, controlled and positioned facilely and properly in accordance with the objects of the invention as stated in the application. However, in the forms of my invention as shown in application Serial No. 404,449; the support wheels will project above the top edges of the side flanges of the plate member when the wheels are in non-use position.

The overall length of the goods which a workman desires to carry on a lift truck or hand truck occasionally is greater than the distance between the support wheels projecting above the top edges of the flanges of the plate member of the loading dock plate. Under such conditions, the goods must undesirably be supported on the lift truck or hand truck at a heighth which will clear the top edges of the loading dock plate support wheels extending above the top edges of the side flanges of the loading dock plate.

One of the objects of my invention is to provide a loading dock plate which one man may facilely and properly handle, control and position.

Another object of my invention is to provide a loading dock plate with a pair of handles which, when moved from non-use position to a position of use for moving the dock plate, will move toward each other until at the point of lifting engagement with the dock plate the outer ends of the handles will be spaced apart only the distance as will most advantageously enable an ordinary man to utilize his strength to facilely raise, move and position the plate, and with the supporting wheels moved automatically to a position in which they are parallel with the sides of the plate.

Another object of my invention is to provide a loading dock plate with a pair of handles which, when in a position of non-use, will be positioned in close to the side edges of the plate, and at the same time move the plate supporting wheels out of supporting contact with the floor to permit the plate to rest firmly and securely thereon.

Another object of my invention is to provide a loading dock plate with a pair of handles which, when in a position of non-use, will permit the plate support wheels to be positioned substantially parallel to the floor.

Another object of my invention is to provide a loading dock plate with a pair of handles which, when moved to a position of non-use, will automatically effect movement of the support wheels to a position in which the axes of the wheels will be substantially at right angles to the floor and with the wheels in parallel relationship to the floor.

My invention includes the various novel features of construction and arrangement hereinafter specified, with reference to the accompanying drawings.

Fig. 1 is a front perspective view of a portable loading dock plate embodying my invention.

Fig. 2 is a perspective side view of the structure shown in Fig. 1.

Fig. 3 is a perspective side view of the structure as shown in Fig. 2, with the loading dock plate bridging two levels of different heights, and with one of the handles moved to position of non-use, and with the other handle partly moved to position of non-use.

Fig. 4 is a perspective side view of the structure shown in Fig. 3, but with both handles shown in position of non-use, and with both support wheels in non-use position in a plane substantially parallel with the floor, and positioned below the top edges of the side flanges of the dock plate.

Fig. 5 is an enlarged fragmentary side view showing the position of one of the support wheels when the handle (not shown in Fig. 5) is in the position of use, as shown in Fig. 1, with the support wheel in parallel relationship with the side of the loading dock plate.

Fig. 6 is an enlarged fragmentary side view showing the position of the support wheel when the handle (not shown in Fig. 6) has been moved clockwise, in Fig. 2, to move the support wheel to the limit of its clockwise rotation position when the support wheel is still in parallel relationship with the side of the loading dock plate.

Fig. 7 is an enlarged fragmentary side elevation view of the support wheel in a position of non-use as shown in Fig. 4.

Fig. 8 is an enlarged fragmentary plan view of the structure shown in Fig. 7, but with the handle member not shown connected to the hub extension member.

Fig. 9 is an enlarged fragmentary sectional view, taken on the line 9—9 in Fig. 8 showing the position of the cam on the wheel frame with respect to the lug, when the support wheel is in non-use position substantially parallel with the floor, as indicated in Fig. 4.

Fig. 10 is an enlarged fragmentary sectional view, similar to Fig. 9, showing the relative position of the cam on the wheel frame with respect to the lug when the handle is moved from non-use position toward position of use to a degree sufficient to cause the notch in the wheel frame to become free from the lug.

Fig. 11 is an enlarged fragmentary sectional view, similar to Fig. 9, showing the position of the cam on the wheel frame when the cam becomes effective.

Referring to the form of my invention as embodied in a loading dock plate as shown in Figs. 1 to 11 inclusive; the dock plate includes the plate member 1 which is formed of any material having the desired tensile strength, such as ordinary steel plate. As a matter of choice, the respective side edges of the plate are upturned to form respective side flanges 2 and 3. If desired, the side flanges may be formed as separate members, and rigidly secured to the plate 1 by any convenient means, such as by welding.

As indicated at 5, I find it convenient to bend downwardly the forward portion of the plate 1 to form a portion of the plate 1 which will be more nearly in the same plane as a higher level, such as is indicated diagrammatically at 7 in Fig. 4, when the dock plate is used for bridging between a lower and a higher level. The downwardly bent portion 5 enables the dock plate to be more securely positioned, as otherwise the forward edge of the plate would project into the air to a degree depending upon the point of contact of the plate 1 with the higher level, if the plate 1 were a plane section of steel plate. If desired, the downwardly bent portion 5 may be formed as a separate piece, and welded at the desired angle to the front edge of the body of the plate 1.

The side flanges 2 and 3 of the plate 1 are provided with respective pivot shaft, or axle shaft, brackets 9 which are rigidly welded to their respective side flanges 2 and 3. As best shown in Fig. 8, the brackets 9 are angularly inclined rearwardly with respect to the vertical plane of the side flanges. The brackets 9 are of a symmetrical design, so that the same bracket construction may be used for both side flanges by merely turning the bracket over bottom side up when used on the opposite side. Thus, both brackets 9 rigidly secured to their respective opposite side flanges of the plate 1 will be convergingly angularly inclined rearwardly with respect to the vertical plane of its side flange.

An axle shaft, or pivot shaft, 10 is rigidly press fitted in an opening formed axially in the boss 11, which is formed as an integral part of the bracket 9. The axis of the boss 11 being at right angles to the outer vertical surface of the bracket 9, which is angularly inclined rearwardly with respect to the vertical plane of the side flanges, the axis of each pivot shaft 10 makes an acute angle with the side flange of the plate 1 to which it is rigidly secured. As indicated in Fig. 8, the axis of a pivot shaft 10 is inclined from a line perpendicular to the side of the plate 1 approximately 10 or 12 degrees toward the rear 12 of the plate 1.

A hub member 15 is pivotally journalled on the shaft 10, and conveniently prevented from axial displacement thereon by a snap ring 16 of a well-known construction. The hub member 15 has integrally extending therefrom a hub extension member 18. The hub extension member 18 includes an integral outer reduced portion 20 to which a handle member 21 is rigidly connected by any suitable means. The handle members 21 conveniently are provided at their outer ends with bent portions 22 to form hand grips for the handles 21.

A wheel supporting frame 24 is journalled on the hub extension member 18. The wheel supporting frame 24 is conveniently prevented from axial displacement on its hub extension member 18 by means of a snap ring 25, similar to the snap ring 16.

Each of the wheel supporting frame members 24 is provided with a pair of spaced apart arms 27 and 27a rigidly or integrally connected to the wheel supporting frame 24. The arms 27 and 27a are provided with aligned openings at their outer ends for the bolt 30 extending therethrough, and which is prevented from axial movement by means of the nut 31. The support wheels 32 are mounted with freedom of rotation on a bearing sleeve 33 which is freely rotatable on the shaft bolt 30. If desired, the wheel 32 may be provided with a roller or similar bearing freely rotatable on the sleeve member 33.

Each of the arms 27 and 27a is provided with a rigid or integrally formed stop lug member 35, which is adapted to come into arresting engagement with the undersurface of the bracket 9 when the handle member 21 has been rotated to position of use, as best indicated in Fig. 5. I provide each of the arms 27 and 27a with a stop member 35, because the same construction may be used for both sides. In Fig. 5, the stop member 35 of the arm 27a shown is inoperative, and it is the opposite stop member 35 on the other arm 27, as shown in Fig. 8, which is the stop member which comes into arresting engagement with the underside of the bracket 9.

The cylindrical portion of the wheel supporting frame 24 is provided with the integrally formed cam member 40 which projects outwardly therefrom at right angles to the axis of the hub extension member 18, as shown in Figs. 9, 10 and 11.

As the same construction is used for both sides of the dock plate, in the manner heretofore described, the wheel supporting frame 24 is also provided with the integrally formed cam member 40a which becomes the operative cam member when the bracket 9 is turned over bottom side up for use on the opposite side. The cam member 40a performs no function when the construction is used as shown in Figs. 9, 10 and 11; and, correspondingly, the cam 40 would perform no function when the bracket 9 is turned over bottom side up for use on the opposite side, and in which case the operating cam would be the cam member 40a.

As best shown in Figs. 9, 10 and 11, the wheel supporting frame 24 is provided with the opening 42 which is adapted to be engaged by the outer end of the outwardly projecting lug 45 rigidly connected to, or integrally formed on, the bracket 9, as hereinafter described.

The wheel supporting frame member 24 is provided with the arcuate member 46 which functions as a guide means in sliding engaging contact with the extending side 9a of the channel shaped bracket 9 and with the arcuate guide face portion 52 formed on the bracket 9 to maintain the wheel supporting frame member 24 and the support wheel 32 in a vertical plane as the wheel supporting frame member 24 and support wheel 32 are rotated clockwise about the pivot shaft 10 from the position shown in Fig. 5 to the position shown in Fig. 6 and vice versa. As the same construction is used for both sides of the dock plate, the wheel supporting frame 24 is also provided at its opposite side with a corresponding arcuate member 46a, which becomes the operative element when the construction is turned over when used on the opposite side of the dock plate.

Clockwise rotation of the structure from the position of use as shown in Fig. 5 to the position shown in Fig. 6 is limited by the end 48 of the flange 49, formed on the supporting frame member 24 and extending beyond the plane of the arcuate member 46, coming into arresting contact with the surface of the extending top side of the channel shaped bracket member 9. The wheel supporting frame 24 is also provided at its opposite side with a corresponding flange 49a, the end 48a of which comes into arresting contact with the top of the bracket member 9 when the construction is turned over for use on the opposite side of the dock plate.

When clockwise rotation of the wheel supporting frame member 24 and support wheel 32 are arrested by the end 48 of the flange 49 coming into arresting contact with the surface of the top side 9ᵃ of the channel shaped bracket member 9, continuation of the clockwise rotation of the handle member 21, rigidly connected to the outer portion 20 of the hub extension member 18, causes the wheel supporting frame 24 and support wheel 32 to rotate on the hub extension member 18. Such rotation of said frame 24 and wheel 32 brings the cam 40 into cooperative engagement with the underside of the upper extending side 9ᵃ of the bracket 9, and subsequently causes the lug 45 to be engaged in the opening 42 in said frame 24, to cause said frame 24 and wheel 32 to be moved from the position as shown in Fig. 6 to the position as shown in Figs. 7 and 8. Such operation of the apparatus is described in detail hereinafter under the heading "Operation."

*Operation*

Referring to the form of my invention as shown in Figs. 1 to 11 inclusive; assume that the dock plate is in the position as shown in Fig. 4, or on a floor, with the support wheels 32 in non-use position, and that it is desired to move the dock plate to a different location. The operator lifts up one handle member 21, rigidly operatively connected to the hub member 15 pivotally journalled on the axle, or pivot, shaft 10, and rotates the handle 21 in a counterclockwise direction, as in Fig. 3, on the axle shaft 10. As the handle 21 is rotatingly moved to effect movement of the wheel 32 to use position, the hub extension 18 will move upwardly about the axis of the axle shaft 10. Such upward movement of the hub extension 18 causes the outwardly projecting lug 45, rigidly connected to the bracket 9, to engage the opening 42 in the wheel supporting frame 24 and cause rotational movement of the wheel supporting frame 24 on the hub extension 18.

As may be observed from Fig. 9, the leverage involved in the initial counterclockwise rotation of the handle 21 is the relative short distance between the axis of the hub extension member 18 and the outer end of the projecting lug 45. With such a short leverage, the resultant rotational movement of the wheel supporting frame 24 on the hub extension member 18 will be relatively rapid until such time as the projecting lug 45 escapes from the opening 42 in the wheel supporting frame 24, as indicated in Fig. 10.

At such point, the cam member 40, integrally formed on the wheel supporting frame 24, becomes effective by reason of its engagement with the bottom of the extending side 9a of the bracket 9, as shown in Fig. 10. The effective leverage involved at this point is greater, and is the distance between the outer edge of the extending channel side 9a and the axis of the hub extension member, and the pressure angle changes from the dash and dot line indication in Fig. 9 to the dash and dot line indication in Fig. 10.

As the handle 21 continues to be rotated counterclockwise, the supporting wheel frame member 24 continues to rotate around the axis of the hub extension member 18 until such rotational movement is arrested by the wheel supporting frame when arcuate member 46 comes into engagement with the outer edge of the extending side 9a of the bracket 9. At this point, the support wheel 32 being mounted at the ends of the arms 27 and 27a rigidly connected to the wheel supporting frame 24, the heretofore described rotational movement of the wheel supporting frame 24 will cause the support wheel 32 to have been moved to a position in which the axis of the support wheel 32 is parallel with the floor, or, in other words, to the usual ordinary position of a wheel.

Continued counterclockwise rotational movement of the handle 21 will cause the wheel supporting frame member 24, etc., with the support wheel 32 sustained in normal wheel position, to move counterclockwise about the axis of the axle shaft 10. Such movement continues until further rotational movement of the handle 21, wheel supporting frame 24, wheel 32, etc. is prevented by the stop lug member 35 of the arm 27 coming into arresting engagement with the undersurface of the bracket 9, and at which time the support wheel 32 is in supporting contact with the floor. Thus, one support wheel 32, positioned in a plane substantially parallel with the side flange of the dock plate, is in contact with the floor and one side of the dock plate raised off the floor.

The operator then moves the other handle 21 in the same manner, which brings the other wheel 32 in contact with the floor and lifts the rearward portion 12 of the dock plate 1 entirely free of the floor, and with the outer hand grip ends 22 of the handles 21 in closer relationship, as indicated in Fig. 1, and with the weight of the dock plate 1 supported on the two support wheels 32.

The operator then pushes downwardly on the hand grip portions 22 of the handles 21, which will cause the forward edge 5 of the dock plate to also be lifted free of contact with the floor, and the dock plate can be moved about freely on the wheels 32, with the dock plate maintained in counterbalanced position entirely free of contact with the floor.

When the dock plate is moved to the desired location, the operator then moves the handle 21 in the reverse, or clockwise, direction, which moves the wheel 32 free of supporting contact with the floor, and with the support wheel 32 maintained in normal vertical wheel position until the end 48 of the flange 49, formed on the wheel supporting frame member 24, comes into arresting contact with the top surface of the side 9a of the channel shaped bracket member 9.

Continued clockwise rotational movement of the handle 21 causes the cam 40 on the wheel supporting frame member 24 to come into effective engagement with the underside of the extending side 9a of the bracket 9. With the cam 40 effective, further clockwise rotational movement of the handle 21 will cause the wheel supporting frame 24 to be rotated on the hub extension member 18 until the support wheel 32 is substantially flat on the floor, and with the axis of the support wheel 32 at right angle to the floor. When the handle member 21 has been rotated to the degree necessary to effect such movement of the support wheel 32 to a position flat on the floor, the handle member 21 likewise will be in contact with the floor. Thus, the wheel 32, etc., and the handle member 21 will be in a position below the top edge of the side flange of the dock plate 1.

The other handle 21 is then also moved in reverse direction in the same manner to cause the other support wheel 32 to also be positioned substantially flat on the floor.

With both support wheels 32 in a substantially flat position on the floor and below the top edges of the side flanges of the dock plate, goods of a greater overall length than the distance between the side flanges of the dock plate can be supported and moved on a lift truck at a height only sufficient to clear the relatively low top edges of the side flanges of the dock plate.

I do not desire to limit myself to the specific details of construction, arrangement, and operation as herein set forth, as it is obvious that various modifications may be made therein without departing from the essential features of my invention, as defined in the appended claims.

I claim:

1. Means for multiple positioning of a wheel comprising a bracket member provided with flanges extending outwardly from the upper and lower portion of said bracket member; an axle shaft extending from said bracket member; a hub member pivotally journaled on said axle shaft; a hub extension member formed on said hub member, the axis of said hub extension member being substantially at right angles to the axis of said axle shaft; a handle member connected to said hub extension member; a wheel supporting frame member journaled on said hub extension member; a support wheel rotatably mounted on said wheel supporting frame member; cam means extending from said wheel supporting frame member; an abutment member, rigidly connected to said bracket member, adapted to be engaged by said cam means extending from said wheel supporting frame member, for effecting rotation of said wheel supporting frame member on said hub extension member; means on said wheel-supporting frame member adapted to engage the outer edge of said flange extending outwardly from the upper portion of said bracket member to arrest rotation of said wheel-supporting frame member on said hub extension member when the axis of said support wheel mounted thereon is parallel with the surface to be contacted by said support wheel; and stop means on said wheel supporting frame member adapted to engage the under side of said flange extending outwardly from the lower portion of said bracket member to arrest rotation of said hub member and said wheel supporting frame member around said axle shaft.

2. Means for multiple positioning of a wheel comprising a bracket member provided with flanges extending outwardly from the upper and lower portion of said bracket member; an axle shaft extending from said base member; a hub member pivotally journaled on said axle shaft; a hub extension member formed on said hub member, the axis of said hub extension member being substantially at right angles to the axis of said axle shaft; a handle member connected to said hub extension member; a wheel supporting frame member journaled on said hub extension member; a support wheel rotatably mounted on said wheel supporting frame member; cam means extending from said wheel supporting frame member; an abutment member, rigidly connected to said bracket member, adapted to be engaged by said cam means extending from said wheel supporting frame member, for effecting rotation of said wheel supporting frame member on said hub extension member; means for effecting alignment of said support wheel including means on said wheel-supporting frame member adapted to engage a portion of said bracket member; and stop means on said wheel supporting frame member adapted to engage the under side of said flange extending outwardly from the lower portion of said bracket member to arrest rotation of said hub member and said wheel supporting frame member around said axle shaft.

3. A portable loading dock plate comprising a rigid base plate member; an axle shaft bracket, provided with flanges extending outwardly from the upper and lower portions thereof, connected to each side of said base member; an axle shaft extending from each side of said bracket; a hub member pivotally journaled on each axle shaft; a hub extension member formed on each hub member, the axis of each hub extension member being substantially at right angles to the axis of the axle shaft on which its hub member is journaled; a handle member connected to each said hub extension member; a wheel supporting frame member journaled on each hub extension member; a support wheel rotatably mounted on each wheel supporting frame member; cam means extending from each wheel supporting frame member, said flanges of said brackets being adapted to be engaged, respectively, by said cam means extending from said wheel supporting frame member, for effecting rotation of each wheel supporting frame member on its respective hub extension member when the handle member thereof is rotated; means on said wheel-supporting frame member adapted to engage the outer edge of said flange extending outwardly from the upper portion of said bracket member to arrest rotation of said wheel-supporting frame member on said hub extension member when the axis of said support wheel mounted thereon is parallel with the surface to be contacted by said support wheel; and stop means on each wheel supporting frame member adapted to engage the under side of said flange extending outwardly from the lower portion of said bracket to arrest rotation of its hub member and said wheel supporting frame member around said axle shaft.

4. A portable loading dock plate comprising a rigid base plate member; an axle shaft bracket, provided with flanges extending outwardly from the upper and lower portions thereof, connected to each side of said base plate member; an axle shaft extending from each side of said bracket; a hub member pivotally journaled on each axle shaft extension; a hub extension member formed on each hub member, the axis of each hub extension member being substantially at right angles to the axis of the axle shaft on which its hub member is journaled; a handle member connected to each said hub extension member; a wheel supporting frame member journaled on each hub extension member; a support wheel rotatably mounted on each wheel supporting frame member; cam means extending from each wheel supporting frame member, said flanges of said brackets being adapted to be engaged, respecively, by said cam means extending from said wheel supporting frame member, for effecting rotation of each wheel supporting frame member on its respective hub extension member when the handle member thereof is rotated; means for effecting alignment of said support wheels including means on each said wheel-supporting frame member adapted to engage a portion of said bracket to arrest rotation of said wheel supporting frame member on said hub extension member when the axis of said support wheel mounted thereon is parallel with the surface to be contacted by said support wheel; and stop means on each wheel supporting frame member adapted to engage the under side of said flange extending outwardly from the lower portion of said bracket to arrest rotation of its hub member and said wheel supporting frame member around said axle shaft.

5. A portable loading dock plate comprising a rigid base plate member; an axle shaft bracket, provided with flanges extending outwardly from the upper and lower portions thereof, connected to each side of said base plate member; an axle shaft extending from each side of said bracket; a hub member pivotally journalled on each axle shaft extension; a hub extension member formed on each hub member, the axis of each hub extension member being substantially at right angles to the axis of the axle shaft on which its hub member is journaled; a handle member connected to each hub extension member; a wheel supporting frame member journaled on each hub extension member; a support wheel rotatably mounted on each wheel supporting frame member; cam means extending from each wheel supporting frame member, said flanges on said brackets being adapted to be engaged, respectively, by said cam means extending from said wheel supporting frame member, for effecting rotation of each wheel supporting frame member on its respective hub extension member when the handle member thereof is rotated; an opening in each of said wheel supporting frame members; an abutment member, rigidly connected to each bracket, adapted to be operatively engaged, respectively, in said opening in said wheel supporting frame members to effect initial rotational movement of said wheel supporting frame member; and stop means on said wheel supporting frame member adapted to engage the under side of said flange extending outwardly from the lower portion of said bracket to arrest rotation of said hub member and said wheel supporting frame member around said axle shaft.

6. A portable loading dock plate comprising a rigid base plate member; an axle shaft bracket rigidly connected to each side of said base member, said bracket being provided with flanges entending outwardly from the upper and lower portions thereof; an axle shaft rigidly connected to each of said brackets; a hub member pivotally journaled on each axle shaft; a hub extension member formed on each hub member, the axis of each hub extension member being substantially at right angles to the axis of the axle shaft on which its hub member is journaled; a handle member connected to each hub extension member; a wheel supporting frame member journaled on each hub extension member; a support wheel rotatably mounted on each wheel supporting frame member; cam means extending from each wheel supporting frame member, said flanges on said brackets being adapted to be engaged, respectively, by said cam means extending from said wheel supporting frame member, for effecting rotation of each wheel supporting frame member on its respective hub extension member when the handle member hereof is rotated; an opening in each of said wheel supporting frame members; an abutment member, rigidly connected to each bracket, adapted to be operatively engaged, respectively, in said opening in said wheel supporting frame member to effect initial rotational movement of said wheel supporting frame member; means for aligning said support wheels; and stop means on said wheel supporting frame member adapted to engage the under side of said flange extending outwardly from the lower portion of said bracket to arrest rotation of said hub member and said wheel supporting frame member around said axle shaft.

References Cited in the file of this patent
UNITED STATES PATENTS

| | | |
|---|---|---|
| 2,335,946 | Klaus | Dec. 7, 1943 |
| 2,597,213 | Whiteman | May 20, 1952 |
| 2,662,236 | Kester | Dec. 15, 1953 |